May 18, 1943. C. M. DRINKWATER 2,319,589
FOOD SERVICE TRUCK
Filed July 11, 1941 2 Sheets-Sheet 1
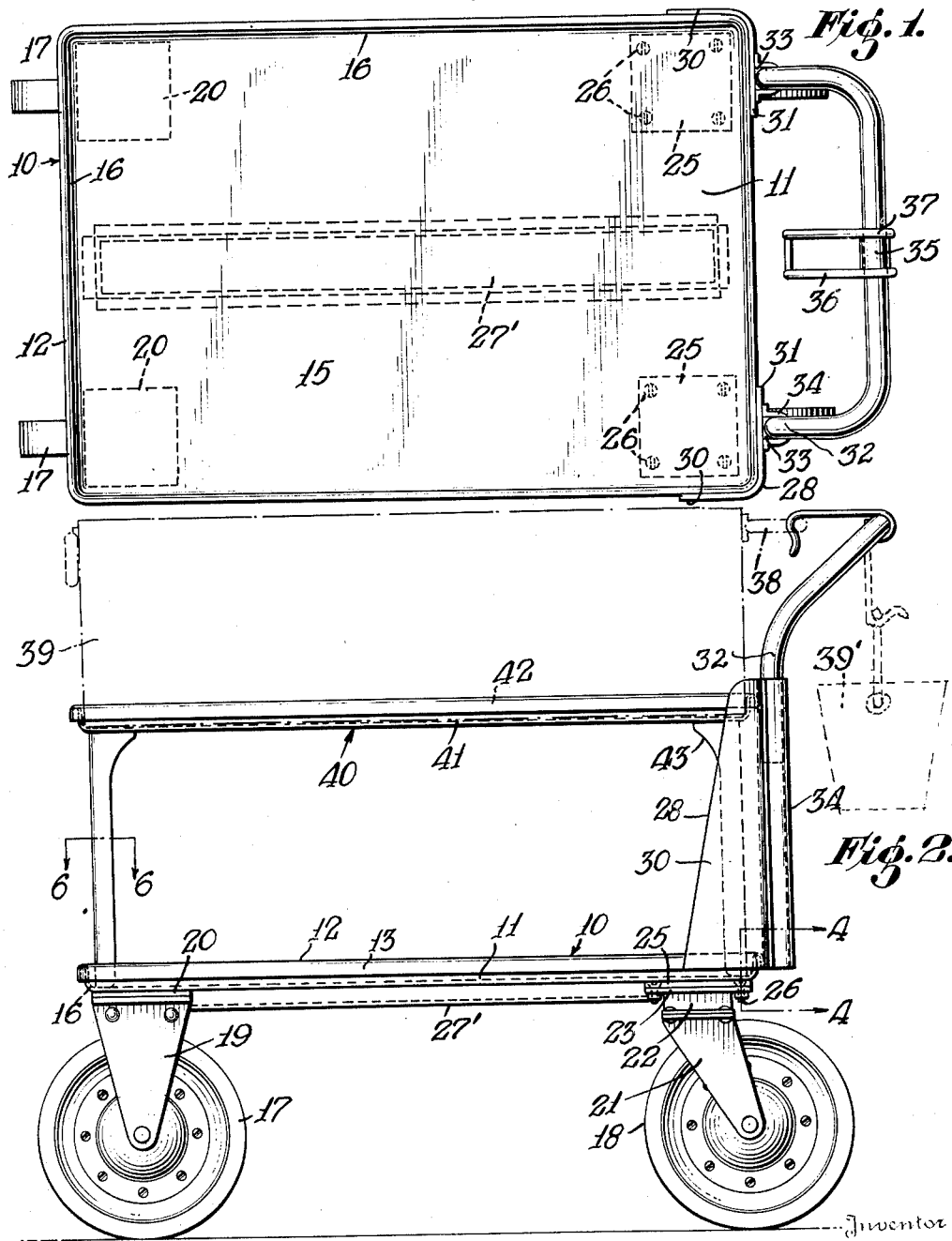
Inventor
C. M. Drinkwater,
By Paul A. Rose,
Attorney May 18, 1943.  C. M. DRINKWATER  2,319,589
FOOD SERVICE TRUCK
Filed July 11, 1941   2 Sheets-Sheet 2
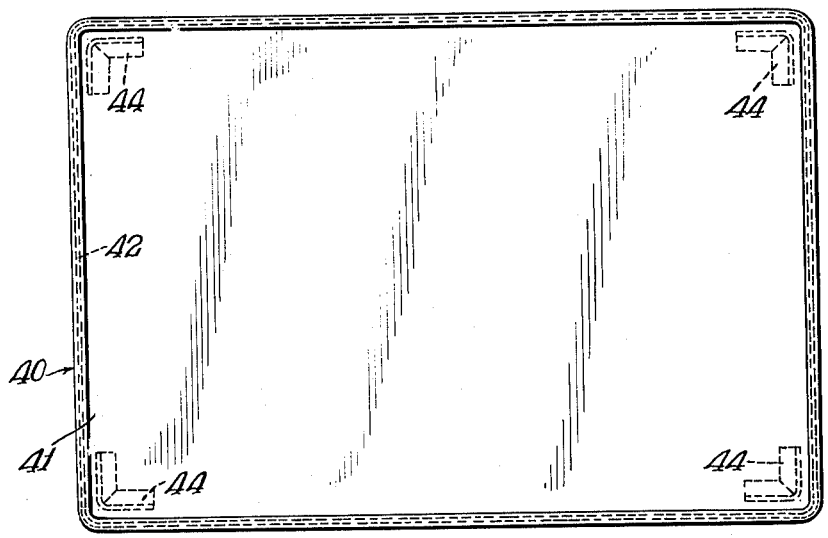
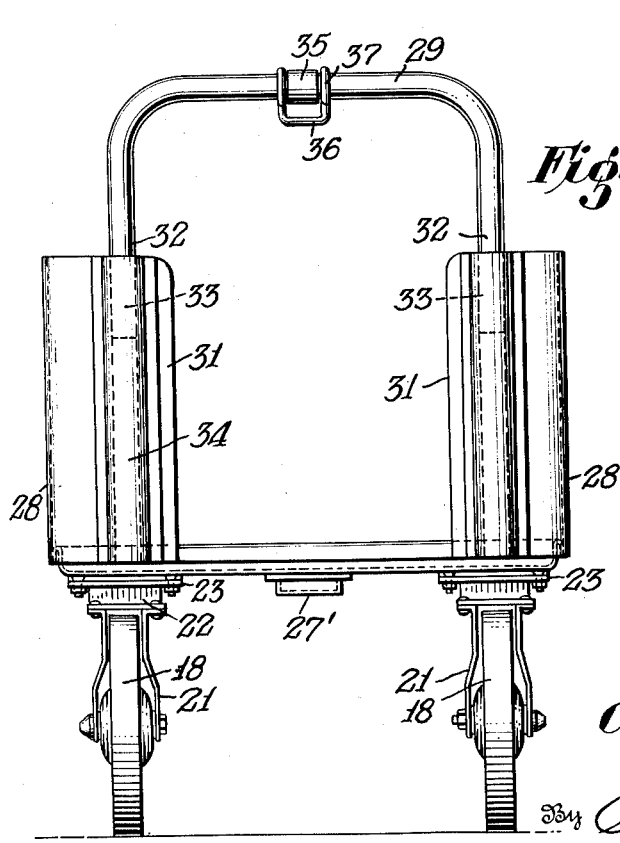
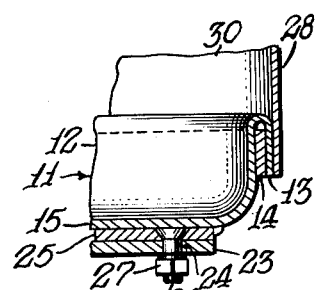

Patented May 18, 1943

2,319,589

UNITED STATES PATENT OFFICE 2,319,589

FOOD SERVICE TRUCK

Charles M. Drinkwater, Chicago, Ill.

Application July 11, 1941, Serial No. 402,021

7 Claims. (Cl. 280—50)

This invention relates to food service trucks of the type employed in transporting food containers from a central kitchen to dispensing stations such as in the wards of hospitals or the like.

The principal object of the invention is to provide a food service truck of sanitary construction which is free of any sharp corners or angles in which dirt and food particles might collect and one which can be kept clean and sanitary with a minimum of effort.

Another object of the invention is to provide a food service truck of simple and strong construction having a unitary platform of sanitary construction which also serves as the main frame member of the truck.

Another object of the invention is to provide a food service truck having a novel platform and main frame member, improved corner guide members for positioning receptacles and the like on the platform and an improved sanitary handle construction carried by the corner guide members.

A further object of the invention is to provide novel and improved means for mounting the wheels of the truck on the underside of the main platform.

A still further object of the invention is to provide a novel removable platform member adapted to be mounted on the main platform to raise containers thereon to a convenient height.

These and other important objects and advantages of the invention will become apparent during the course of the following detailed description of the invention with reference to the accompanying drawings which form a part hereof and in which:

Fig. 1 is a plan view of a truck embodying the invention;

Fig. 2 is a side elevation thereof, with the removable platform in operative position on the truck;

Fig. 3 is a rear elevation, with the removable platform removed;

Fig. 4 is a section on the line 4—4 of Fig. 2;

Fig. 5 is a plan view of the removable platform, and

Fig. 6 is a section on the line 6—6 of Fig. 2.

Referring more particularly to the details of the construction illustrated by the drawings, the main platform and frame unit 10 is comprised of a shallow flat bottomed sheet metal pan 11 of substantially rectangular form provided with a continuous upstanding marginal flange or rim 12. The flange 12 is reinforced by bending the edge of the same outwardly upon itself at 13 over a reinforcing metal band 14 of substantial weight and welding the same into a unit. The turned-over edge 13 forms a rounded top on the flange 12 which is smooth and easily cleaned and the flange serves the dual purpose of reinforcement of the platform and preventing food receptacles from sliding off of the same.

The bottom 15 of the pan 10 is flat and seamless and is rounded into the marginal flange 12 as indicated at 16 so as to eliminate any sharp angles at either the sides or ends of the bottom. The corners of the pan 10 are also rounded and the rounded portion 16 continues around the corners so that dirt pockets at these points are effectively eliminated.

The platform is mounted on front rigid rubber tired caster wheels 17 and rear swivelled rubber tired caster wheels 18. The front caster wheels are journalled between depending bracket arms 19 which are rigidly fastened as by welding to mounting plates 20 which are welded to the underside of the flat bottom 15 of the pan 10 adjacent the front corners.

The rear swivelled caster wheels 18 are journalled between bracket arms 21 provided with a ball bearing swivel mount 22 including a mounting flange 23 provided with bolt holes 24. Mounting plates 25 for the swivel casters are welded to the underside of the flat bottom 15 of the pan 10 adjacent the rear corners. These mounting plates carry depending threaded studs 26 spaced to extend through the bolt holes 24 in the flange 23. The threaded studs are rigidly fastened to the mounting plates before the latter are welded in position by passing the same through holes drilled in the plates which are countersunk to receive the heads of the studs, the latter being welded in place so that the studs will not turn. Nuts 27 threaded on the ends of the studs 26 projecting through the mounting flange 23 serve to demountably secure the swivel caster mounts in position on the mounting plates 25.

A longitudinally extending boxed sheet metal brace member 27', welded to the underside of the pan 10, extends the full length thereof and is centered between the mounting plates 20 and 25.

By assembling the fastening bolts 26 in the plates 25 before securing the plates in position and by welding the mounting plates 20 and 25 and the pan brace 27' to the bottom of the pan, the inside surface is left smooth, sanitary and easily cleaned. Also the absence of bolt or rivet holes eliminates the possibility of leakage of any liquid which may be spilled into the pan.

Vertical angular corner guide members 28 mounted at the rear corners of the platform provide guides for positioning containers on the platform and supports for the handle bar 29. The corner members 28 are formed of sheet metal shaped to the contour of the corners of the platform 10 and have side webs 30 and rear webs 31 welded at the lower ends thereof to the outside of the marginal flange 12. The handle bar 29 is formed of tubular stock in one piece with depending legs 32 which fit into sockets 33 formed by brackets 34 extending from top to bottom of the rear web 31 of the members 28 and welded thereto. The top of the sockets 33 around the legs 32 is preferably filled with welding material and smoothed off. The brackets 34 act as reinforcement for the members 28 and at their lower ends provide a socket for mounting a post type swivel caster in an emergency in case one of the swivel casters gets broken and a replacement of the same type is not readily available. Since many trucks using post type casters are now in service, with replacements more readily available, it will be appreciated that the possibility of using either type of swivel caster in an emergency will give greater assurance of ability to keep the new trucks in service even though proper replacement caster wheels are not immediately available in case of breakage.

The legs of the handle bar slant rearwardly from the sockets 33 to space the bar 29 from the truck a convenient distance and the bar is provided with a spacer sleeve 35 centered thereon between the legs and welded in place. A bifurcated wire hook 36 swivelled on the bar 29 by the ends 37 looped therearound on opposite sides of the sleeve 35, is retained against lateral movement along the bar by the sleeve. The hook 36 is adapted to engage the looped handle 38 of a receptacle 39 mounted on the truck to hold the same in position in cooperation with the corner guides 28 or, as indicated in dotted lines in Fig. 2, is used to suspend a bucket 39' from the handle.

The truck is equipped with a removable sanitary platform 40 having a pan-shaped body 41 similar in dimensions and construction to the body of the truck itself. This platform is formed of metal with a flat bottom and rounded sides and corners and an upstanding marginal flange 42 reinforced by turning the edge of the same over a metal band as in the case of the main truck platform. The removable platform is provided with legs 43 angular in cross section which are enlarged at the top and which have the upper ends of the webs thereof bent inwardly at right angles to form bearing plates 44 which are welded to the bottom of the pan 41 adjacent the corners thereof. The legs 43 are mounted on the pan 41 so that when the removable platform is placed on the truck with one end fitted against the corner members 28, the legs 43 will be positioned over the mounting plates 20 and 25, respectively, thereby transmitting the weight of the load on the platform directly to the caster wheels and relieving the pan body 10 of the truck of undue bending strains. The removable platform is used when a single deck receptacle or receptacles are carried by the truck in order to raise the same to a convenient height for dispensing the food contained therein. When a double tier of receptacles is carried the platform is removed and the receptacles are mounted directly on the main platform.

While a preferred embodiment of the invention has been shown and described by way of illustration, it will be understood that modification of the details of construction may be resorted to without departing from the spirit of the invention within the scope of the appended claims.

I claim:

1. In a wheeled truck of the character described, a combined body and frame member comprising a flat bottomed rectangular metal pan having an upstanding continuous marginal flange integral therewith, wheel mounting plates welded to the underside of the bottom of said pan adjacent the corners thereof, the mounting plates at one end of said truck having depending threaded studs rigidly secured thereto for fastening castor wheel mounts thereon, upstanding angular corner members mounted at the last mentioned end of said pan body having side and rear webs welded at the lower ends thereof to the outer side of said marginal flange, and a vertically extending tubular bracket welded to the outer face of the rear web of each of said corner members providing a socket at the upper ends thereof for the reception of the ends of a handle bar.

2. In a wheeled truck of the character described, a combined body and frame member comprising a flat bottomed imperforate rectangular metal pan having an upstanding integral continuous marginal flange, the portions of said pan between the bottom and marginal flange being rounded and the same having rounded corners to provide a smooth sanitary inner surface, wheel mounts welded to the underside of the pan bottom adjacent the corners thereof, upstanding angular corner guide members mounted at one end of said pan body and having side and rear webs joined by a curved portion shaped to the contour of the corners of said pan, said webs being secured at the lower ends thereof on the outer side of said marginal flange, and a vertically extending socket forming bracket member secured on the rear web of each of said corner guide members providing a mounting for the ends of a tubular handle member.

3. In a wheeled truck of the character described, a combined body and frame member comprising a flat bottomed metal pan formed with an integral upstanding marginal flange integral with the bottom and joined thereto by a curved wall portion, said flange having the upper edge thereof turned outwardly upon itself over a reinforcing metal band and having the corners rounded whereby to provide a smooth unbroken sanitary surface over the entire inner pan surface, wheel mounts welded to the underside of the pan bottom adjacent the corners thereof, upstanding angular corner guide members mounted at one end of said pan body and having side and rear webs joined by a curved portion shaped to the contour of the corners of said pan, said webs being secured at the lower ends thereof on the outer side of said marginal flange, and a vertically extending socket forming bracket member secured on the rear web of each of said corner guide members adapted to seat the ends of a handle bar in the upper ends thereof.

4. In a truck of the character described, a combined body and frame member comprising a flat bottomed rectangular metal pan having an upstanding integral continuous marginal flange, the portion of said pan between the bottom and marginal flange being rounded and the same having rounded corners to provide a smooth sanitary inner surface, wheel mounts welded to the underside of the pan bottom adjacent the corners thereof, caster wheels secured to said wheel mounts, upstanding angular corner guide members mounted at one end of said pan body and having side and rear webs joined by a curved portion shaped to the contour of the corners of said pan, said webs being secured at the lower ends thereof on the outer side of said marginal flange, a socket forming bracket member secured on the rear web of each of said corner guide members, a tubular handle bar having depending legs seated in the sockets provided by said bracket members, a removable platform member comprising a pan body having a flat bottom and integral marginal flange of the same dimensions and contour as the pan body of said truck and adapted to be mounted on the pan body of said truck with one end thereof fitting between the side webs of said corner members and against the rear webs thereof, said removable platform having depending legs welded to the underside thereof adjacent the corners and positioned to rest on the bottom of the pan body of said truck directly over the wheel mounts thereof when said platform is mounted on said truck as aforesaid.

5. In a wheeled truck for receiving and transporting food containers, an integral body and frame member comprising a flat bottomed rectangular pan of sheet metal bent to form upstanding continuous side and end flanges having the upper edges thereof turned outwardly and downwardly to form a continuous depending reinforcing lip, said pan having caster wheel mounts welded to the underside of the bottom thereof adjacent the corners, a pair of upstanding angular sheet metal corner members at one end of said body having side and rear webs of substantial area extending along and welded to the outer surface of said reinforcing lip adjacent said corners, said angle members having a tubular vertically extending bracket welded to the outer side of the rear web thereof providing a socket at the upper ends thereof adapted for reception of the ends of a handle bar.

6. In a wheeled truck for receiving and transporting food containers, an integral body and frame member comprising a flat bottomed rectangular pan of sheet metal bent to form upstanding continuous side and end flanges having the upper edges thereof turned outwardly and downwardly to form a continuous depending reinforcing lip, said pan having a longitudinally extending metal brace member welded to the underside thereof midway between the sides and caster wheel mounts welded to the underside of the bottom thereof adjacent the corners, a pair of upstanding angular sheet metal corner members at one end of said body having side and rear webs of substantial area extending along and welded to the outer surface of said reinforcing lip adjacent said corners, said angle members having a tubular vertically extending bracket welded to the outer side of the rear web thereof providing a socket at the upper ends thereof adapted for reception of the ends of a handle bar.

7. In a wheeled truck for receiving and transporting food containers, an integral body and frame member comprising a flat bottomed rectangular pan of sheet metal bent to form upstanding continuous side and end flanges having the upper edges thereof turned outwardly and downwardly to form a continuous depending reinforcing lip, said pan having caster wheel mounts welded to the underside of the bottom thereof adjacent the corners, a pair of upstanding angular sheet metal corner members at one end of said body having side and rear webs of substantial area extending along and welded to the outer surface of said reinforcing lip adjacent said corners, said angle members having a tubular vertically extending bracket welded to the outer side of the rear web thereof providing a socket at the upper ends thereof adapted for reception of the ends of a handle bar, a removable platform member comprising a pan body of substantially the same dimensions and edge formation as the pan body of said truck and adapted to be mounted thereon with one end fitting between the side webs of said corner members and against the rear webs thereof, said removable platform having depending legs welded to the underside of the pan body adjacent the corners thereof and positioned to rest on the bottom of the pan body of said truck directly over the wheel mounts thereof when said platform is mounted on said truck with one end disposed as aforesaid.

CHARLES M. DRINKWATER.